Figure 2:
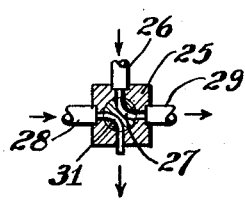
Figure 2:
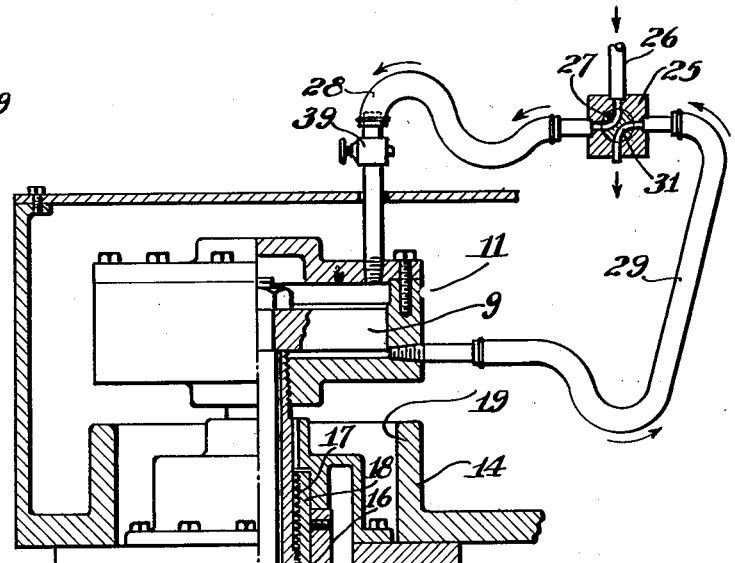

Feb. 2, 1943.                W. H. EMERSON                2,310,068
                PRESSING APPARATUS FOR PLASTIC MATERIAL
                Filed Nov. 28, 1939          2 Sheets-Sheet 1

INVENTOR.
Walter H. Emerson
BY Brown, Critchlow & Flick
his ATTORNEYS.

Feb. 2, 1943.  W. H. EMERSON  2,310,068
PRESSING APPARATUS FOR PLASTIC MATERIAL
Filed Nov. 28, 1939  2 Sheets—Sheet 2
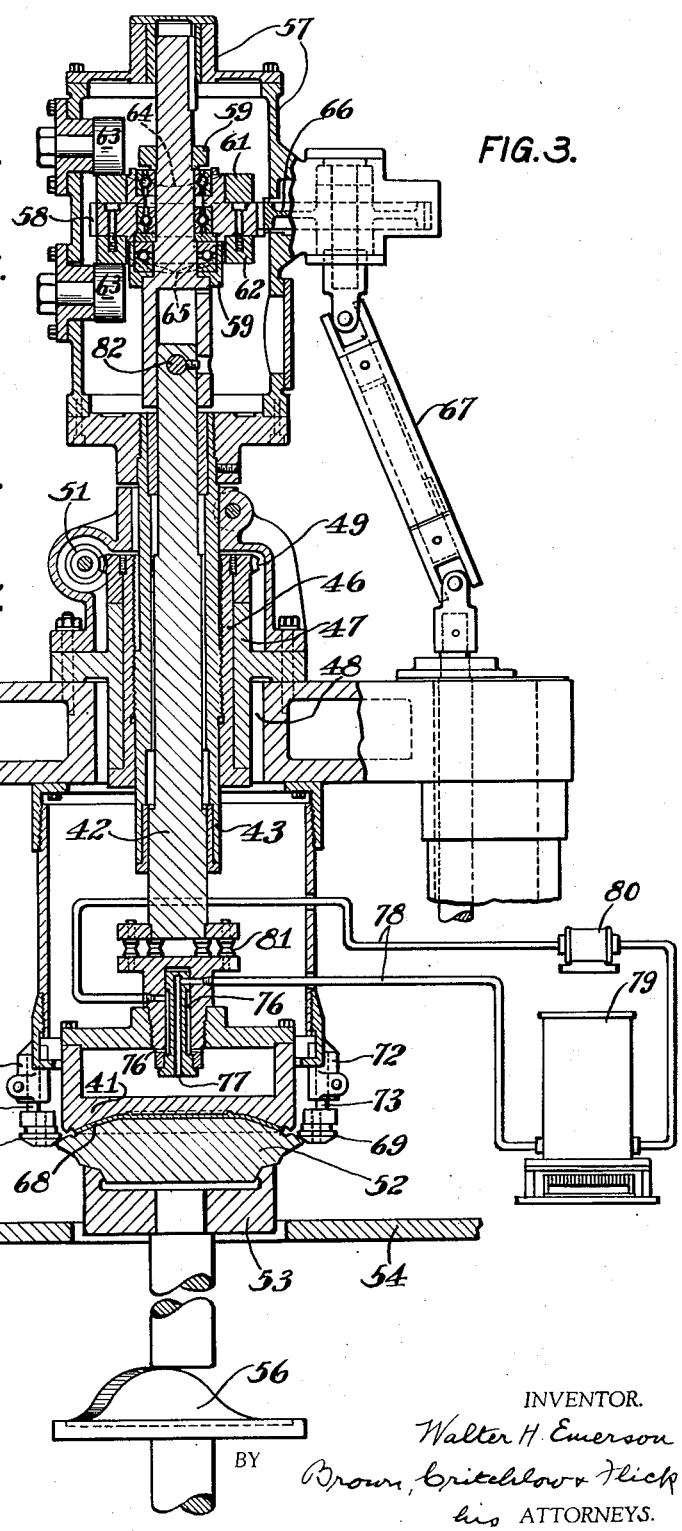
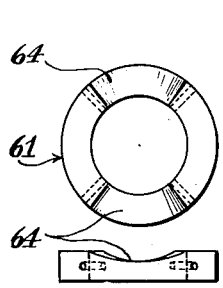
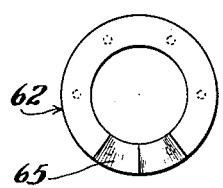
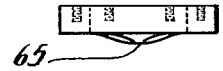
INVENTOR.
Walter H. Emerson
BY Brown, Critchlow & Flick
his ATTORNEYS.

Patented Feb. 2, 1943

2,310,068

UNITED STATES PATENT OFFICE 2,310,068

PRESSING APPARATUS FOR PLASTIC MATERIAL

Walter H. Emerson, East Liverpool, Ohio, assignor to The Homer Laughlin China Company, Newell W. Va., a corporation of Delaware Application November 28, 1939, Serial No. 306,482

17 Claims. (Cl. 25—27)

This invention relates to apparatus for shaping articles from clay or other plastic material, and more particularly to pressing apparatus for preforming dinnerware and similar articles.

In certain types of automatic machines for making dinnerware and the like from clay or other suitable plastic material, a blank of clay is deposited on a mold on which it is then pressed by a die for preforming it into the general shape of the finished article. The mold with the preformed blank or parison on it is then transferred from the die to a jiggering station where the exposed surface of the blank is finished by a profiling tool. To avoid sticking of clay to the preforming die after the pressing operation various expedients have been used, the most common and extensively used being heating of the die. This is generally sufficient for the purpose, but occasionally a blank does not separate from the die, and the mold and blank therefore stick to the die when they should move on to the jiggering station. In such a case this mold, and the next succeeding mold which automatically moves into place to have the blank thereon preformed by the die, are crushed together when the die pressure is applied. This results not only in a smashing of the two molds and an upsetting of the entire operation, but is a dangerous situation because the molds virtually explode as they are crushed together, and their pieces fly in all directions with great enough force to injure workmen. One of the causes of the blank sticking to the die is the cooling of the heated die below the minimum temperature at which separation is effected satisfactorily. Attempts have been made to maintain a uniform die temperature, but they have not been dependable.

It is among the objects of this invention to provide pressing apparatus of the above-mentioned type which positively strips a mold from a die at the end of a pressing operation whenever their separation is not otherwise effected, which accommodates molds of various thicknesses, which is capable of pressing articles of different thicknesses, which maintains a substantially uniform die temperature, and in which the maximum pressure to which a blank is subjected is controllable.

In accordance with this invention, a mold is loosely mounted on a suitable support above which there is a die for shaping a blank of plastic material over the upper surface of the mold to preform an article of dinnerware or the like. Means is provided for effecting relative movement of the mold and die toward and away from each other to carry out the pressing operation, and the die is also preferably adjustable toward and away from the mold so that ware of different thicknesses can be produced. It is desirable to heat the die to prevent the plastic from adhering thereto, preferably by delivering to the die an excess number of B. t. u's so that its temperature will not be reduced. To insure separation of the blank from the die when there is a tendency for them to stick together, means is provided for engaging the mold to positively strip it from the die. Most suitably the stripping means is mounted in stationary but vertically and radially adjustable position to accommodate molds of different thicknesses and diameters, and the die is elevated to separate it from the mold which is prevented from rising by the stripper. The die may be raised and lowered by mechanical means, or by fluid under pressure which may be adjustable to apply a predetermined pressure to the die in its lower operative position. In the latter case the maximum pressure to which the blank is subjected is controlled, because if there is a tendency to exceed this pressure the die is raised by the blank against the fluid pressure that normally holds the die down.

Figure 1:
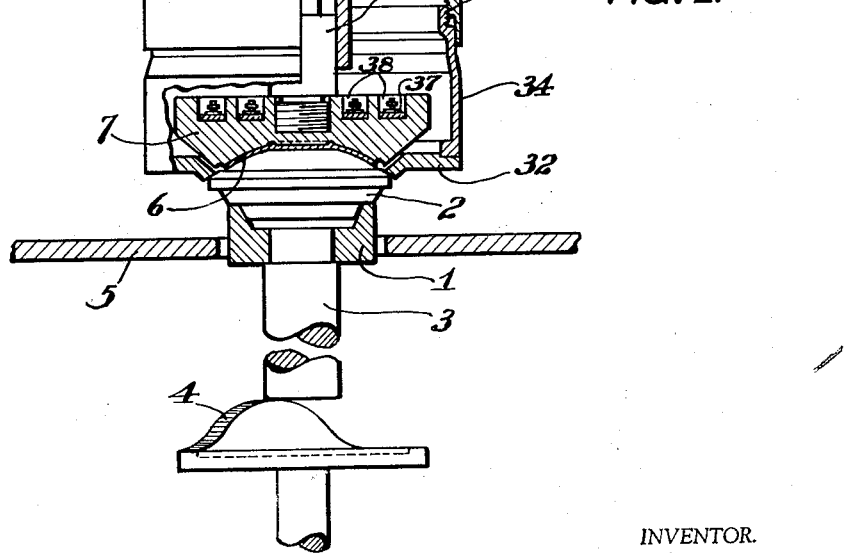

The invention is illustrated in the accompanying drawings in which Fig. 1 is a side view, partly in section, of my pressing apparatus; Fig. 2 is a vertical section of the valve that controls supply of pressure fluid to the cylinder, the valve being shown in its die-raising position; Fig. 3 is a vertical section through another embodiment of this invention; Figs. 4 and 5 are plan and side views, respectively, of the upper die-retracting cam; and Figs. 6 and 7 are bottom and side views, respectively, of the lower cam.

Referring to Fig. 1 of the drawings, a chuck 1 is provided in its upper surface with a recess in which a dinnerware mold 2 is loosely mounted. The chuck periodically removes a mold from and returns it to a tray or a conveyor of any desired construction, as for example, a rotatable table 5. This chuck is mounted on the upper end of a shaft 3 that is raised and lowered at periodic intervals by any suitable means, such as a cam 4 rotated in any suitable manner. A blank 6 of plastic material, such as clay, carried on the upper surface of the mold is pressed by the rising mold against a die 7 directly above the mold in axial alignment therewith. The die pressure shapes the blank over the mold to form a parison; that is, it preforms an article of dinnerware of slightly greater thickness than the intended finished ware.

The die is preferably mounted on the lower end of a piston rod 8, to the upper end of which a piston 9 is secured. The piston is disposed in a cylinder 11 rigidly mounted on the upper end of a guide tube 12, in the lower enlarged end of which an enlarged portion 13 of the piston rod slides and also seals the tube. The cylinder is supported by this tube, which is mounted in a support 14 that forms a part of the frame structure of the machine. Tube 12 is preferably connected to the support by screw threads 16 that engage interior threads 17 in a sleeve 18 journaled in a vertical opening 19 in support 14. By keying a worm gear 21 to the sleeve and rotating this gear by a manually operable worm 22, the guide tube, and consequently the cylinder and the die, can be adjusted vertically relative to the mold to vary the spacing between the die and mold for pressing ware of different thicknesses.

It is a feature of this invention that the blank and mold are positively stripped from the die whenever the blank tends to adhere to the die as chuck 1 is lowered. Accordingly, fluid under pressure, such as air, is introduced into the top of the cylinder through conduit 26, valve passage 27 of valve 25, and conduit 28 for normally holding the die in its lower operative position. At such times the bottom of the cylinder is exhausted to the atmosphere through conduit 29 and valve passage 31. When the valve is turned to the position shown in Fig. 2, passage 27 connects air supply conduit 26 with conduit 29, and passage 31 connects conduit 28 with the atmosphere, whereby air is introduced into the bottom of the cylinder to raise or retract the die.

Furthermore, means is provided for limiting upward movement of the mold and thereby preventing it from following the die when the latter is raised. Such means preferably comprises a rigid stripping ring 32 encircling the die and disposed in contact with or slightly above the upper surface of the mold near its edge when the mold is in its upper position. This ring is connected to support 14 by suitable means, such as upper and lower casing members 33 and 34 that desirably have their adjoining ends connected by screw threads 36. Thus, by rotating ring 32 and attached lower casing member 34 the ring can be adjusted vertically relative to the chuck to accommodate molds of different thicknesses such as are used for making ware of different types. When fluid pressure is supplied to the bottom of cylinder 11, the piston and die are raised a short distance, but the blank can not adhere to the die and cause the mold to leave the chuck an appreciable amount because the stripper ring positively limits upward movement of the mold.

The die may be heated in any suitable manner, such as by a plurality of electrical resistance elements 37 mounted in concentric annular grooves 38 in the upper portion of the die. This generally prevents the blank from adhering to the die, and even when it does not do so it helps to prevent particles of the clay sticking to the die when the blank is stripped therefrom by the means disclosed herein. The heating of dies to facilitate their separation from moist clay is well known in this art, heated dies having been so used for decades.

In operation, a mold carrying a disc-like blank of clay or the like is delivered to chuck 1 in any suitable manner, as for example as shown in my copending application Serial No. 328,658, filed April 9, 1940. The mold is then raised by cam 4 to press the blank against die 7 which is held in its lower position by the pressure of fluid in the top of cylinder 11. This operation shapes blank 6 between the mold and die to preform an article of dinnerware of slightly greater thickness than the finished article is to be. By placing an adjustable pressure relief valve 39 in conduit 28, the amount of pressure applied to the blank during the pressing operation can be controlled. That is, when the pressure on the blank exceeds that for which valve 39 is set, fluid above the piston will escape through the relief valve to allow the die to rise to avoid undesired pressure on the blank.

As soon as the blank has been preformed, fluid valve 25 is turned to the position shown in Fig. 2 to supply fluid under pressure to the bottom of the cylinder and to release it from the top thereof. This causes the piston to rise and lift the die away from the blank and mold which stripper ring 32 prevents from following the die if there is any tendency for the blank to stick to the die. Cam 4 then permits the chuck to lower the mold onto conveyor 5 by which it is carried to a jiggering station where the exposed surface of the blank is cut down and finished by a profiling tool in the usual or any desired manner. In the meantime fluid control valve 25 is turned back to the position shown in Fig. 1 to again lower the die for the next pressing operation. This valve may be operated automatically in any well known manner, such as by the means that operates the cam.

In the embodiment of the invention shown in Fig. 3 a hollow die 41 is preferably mounted on the lower end of a non-rotatable rod 42 slidably disposed in a vertical guide tube 43. The tube is mounted in a support 44 that forms a part of the frame structure of the machine and is preferably connected to the support by screw threads that engage interior threads in a sleeve 46 journaled in a bearing 47 rigidly mounted in a vertical opening 48 in the support. By keying a worm gear 49 to the sleeve and rotating this gear by a manually operable worm 51, guide tube 43 can be adjusted vertically relative to the mold 52 to vary the spacing between the die and mold for pressing ware of different thicknesses. As in the first embodiment, the mold is loosely mounted on a chuck 53 periodically raised and lowered through a table 54 by a cam 56.

In this embodiment the die is raised at the conclusion of each pressing operation by mechanical means mounted in a housing 57 supported by the upper end of guide tube 43. This lifting or retracting means preferably comprises a gear 58 rotatably mounted on the upper portion of die rod 42 where it is held against movement axially thereof by means of collars 59 or the like. The upper and lower surfaces of the gear are provided with cams 61 and 62, respectively, that engage and travel between one or more pairs of cam follower rollers 63 journaled in the sides of housing 57. As shown in Figs. 4 to 7, the upper cam is provided with a depression 64 for each upper roller, and directly below one of the depressions the lower cam has a projection 65. When these portions of the cams reach the rollers the cams, gear, rod and die are all raised. This happens just before the chuck starts to move downwardly. Gear 58 is rotated by a pinion 66 journaled in a lateral projection of the housing where it is driven through a telescoping shaft 67 from the main drive of the machine. The telescoping shaft permits housing 57 to be adjusted vertically with the guide tube.

The means by which the mold is prevented from following the retracting die when the blank 68 tends to adhere to it comprises a plurality of circumferentially spaced contact members 69, preferably inverted frusto-conical shaped rubber pads, for engaging the top of the mold near its edge. These pads are connected to the main support 44 by an extensible tubular casing 71 that encircles the lower portion of the die rod, the lower end of this casing being provided with hollow split bosses 72 that receive the upper portions of vertical pins 73 connected to the contact pads. Each pin is connected to the underlying pad eccentrically thereof so that the pad may be swung outwardly to accommodate molds of greater diameter. The pins can also be adjusted vertically in their bosses to accommodate molds of different thicknesses.

To heat the die it is provided with inlet and outlet passages 76 and 77 connected by flexible conduits 78 to a tank 79 in which a fluid, such as oil, is heated by electricity or other suitable means, and delivered to the die by a pump 80. The temperature of the fluid in the heating tank is maintained substantially constant by a thermostat control (not shown) associated with the tank. The hot fluid is circulated through the die fast enough to deliver more B. t. u.'s to the die than are dissipated by it, whereby the temperature of the die is maintained substantially uniform which is highly desirable in the production of high quality dinnerware. Transfer of heat from the die to the die rod and associated elements is minimized by spacing the die from the rod by means of heat insulating members 81 having reduced central portions.

The accidental application of injurious pressure by the die is prevented by dividing the die rod into two telescoping sections normally rigidly connected by a shear pin 82 in housing 57.

Pressing apparatus constructed in accordance with this invention is fully automatic, accommodates molds of different diameters and thicknesses, is adjustable for shaping articles of various thicknesses, applies only a predetermined pressure to a blank, and positively strips molds and blanks from the pressing die whenever necessary so that proper functioning of the machine will not be interrupted by blanks sticking to the die. Also, the temperature of the die is maintained substantially uniform so that the quality of the ware is improved and the likelihood of clay adhering to the die is greatly minimized.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. Pressing apparatus for shaping articles of clay and the like, comprising a vertically reciprocable chuck adapted to loosely support a mold carrying a blank of clay, a vertically reciprocable die disposed above the chuck, a vertical rod rigidly connected to the top of said die, ring-like cam means rotatably mounted in axially fixed position on said rod, the lower surface of said means being provided with a projection and the upper surface being provided with a recess, means for rotating said cam means around the rod, means for raising the chuck to press the blank against the die to thereby shape the blank over the mold, cam follower rollers rotatably mounted in fixed position in engagement with said upper and lower surfaces of said cam means for raising and lowering the die during rotation of said cam means, means adapted to engage the upper surface of the mold near its edge for limiting upward movement of the mold when the die is raised, and means for supporting said mold-engaging means in fixed position.

2. Pressing apparatus for shaping articles of clay and the like, comprising a movable mold adapted to support a blank of clay, a vertically reciprocable rod above the mold, a die mounted on the lower end of the rod, a ring-like cam rotatably mounted on the rod, means holding the cam against movement axially of the rod, means for rotating the cam, cam follower means mounted in fixed position for raising and lowering said rod as the cam travels over said follower means, and stationary means adapted to engage the mold while the die is rising to prevent the mold from following the die.

3. Pressing apparatus for shaping articles of clay and the like, comprising a supporting member adapted to loosely support a movable mold carrying a blank of clay, a die member, means for effecting relative movement of said members toward and away from each other to press the blank over the mold, and means adapted to engage the mold and strip it from the die member while said members are separating, said stripping means comprising a plurality of circumferentially spaced contact members adapted to engage the blank-supporting surface of the mold, said contact members being adjustable radially of said mold to accommodate molds of different diameters.

4. Pressing apparatus for shaping articles of clay and the like, comprising a vertically reciprocable chuck adapted to loosely support a mold carrying a blank of clay, a vertically reciprocable die disposed above the chuck, means for raising the chuck to press the blank against the die to thereby shape the blank over the mold, means for raising the die, a plurality of circumferentially spaced contact members adapted to engage the upper surface of the mold near its edge for limiting upward movement of the mold when the die is raised, and means for mounting each of said contact members for adjustment around a vertical axis eccentric to its central axis.

5. Pressing apparatus for shaping articles of clay and the like, comprising a movable mold adapted to support a blank of clay, a support, a die suspended from said support, means for pressing the die and blank together for shaping the blank over the mold, said die having a lower pressing surface substantially coextensive with the upper surface of said blank whereby the upper surface of the clay is engaged only by the die, means for retracting the die, a casing rigidly suspended from said support and surrounding the die, a second casing connected to the lower end of the first casing and adjustable vertically relative thereto, and a substantially horizontal ring connected to the lower end of said second casing and adapted to encircle the upper surface of the mold near its edge to prevent the mold from following the die as it is retracted.

6. Pressing apparatus for shaping articles of clay and the like, comprising a movable mold adapted to support a blank of clay, a support provided with a vertical opening therethrough, an interiorly threaded sleeve journaled in said opening, a tube threaded in said sleeve, means for rotating the sleeve to adjust said tube vertically, a rod slidably disposed in said tube, a die secured to the lower end of the rod, means for moving the rod vertically to lower and raise the die, and means for engaging the upper surface of the mold near its edge to limit upward movement of the mold.

7. Pressing apparatus for shaping articles of clay and the like, comprising a supporting member adapted to loosely support a movable mold carrying a blank of clay, a hollow impermeable die member, means for circulating a hot liquid through the die member, means for effecting relative movement of said members toward and away from each other to press the blank over the mold, said die member having a pressing surface substantially coextensive with the adjoining surface of said blank whereby the latter surface is engaged only by the die member, and rigidly mounted means adapted to engage the mold and strip it from the die member while said members are separating.

8. Pressing apparatus for shaping articles of clay and the like, comprising a die formed to press a charge of plastic material into the form of a blank on a mold, said die having a lower pressing surface substantially coextensive with the upper surface of said blank whereby said upper surface is engaged only by the die, means for periodically raising the die from pressing position, means for raising a mold toward the die in pressing position to effect said pressing and for lowering the mold after said die is raised, and stationary means adapted to be engaged by the upper surface of a mold near its edge to hold down the mold when the die is raised.

9. Pressing apparatus for shaping articles of clay and the like, comprising a mold adapted to support a charge of clay, a die against which said charge is pressed into the form of a blank on the mold, said die having a lower pressing surface substantially coextensive with the upper surface of said blank whereby the upper surface of the clay is engaged only by the die, means for periodically raising the die from pressing position, means for raising the mold toward the die in pressing position to effect said pressing and for lowering the mold immediately after said die is raised, means adapted to be engaged by the upper surface of the mold near its edge to hold down the mold when the die is raised, and means rigidly supporting said mold-engaging means.

10. Pressing apparatus for shaping articles of clay and the like, comprising a mold adapted to support a charge of clay, a die against which said charge is pressed into the form of a blank on the mold, said die having a lower pressing surface substantially coextensive with the upper surface of said blank whereby the upper surface of the clay is engaged only by the die, means for periodically raising the die from pressing position, means for raising the mold toward the die in pressing position to effect said pressing and for lowering the mold immediately after said die is raised, and vertically adjustable stationary means adapted to be engaged by the upper surface of the mold near its edge to hold down the mold when the die is raised.

11. Pressing apparatus for shaping articles of clay and the like, comprising a mold adapted to support a charge of clay, a die against which said charge is pressed into the form of a blank on the mold, said die having a lower pressing surface substantially coextensive with the upper surface of said blank whereby the upper surface of the clay is engaged only by the die, fluid pressure actuated means holding the die in pressing position and for periodically raising the die therefrom, means for raising the mold toward the die in pressing position to effect said pressing and for lowering the mold immediately after said die is raised, and stationary means adapted to be engaged by the upper surface of the mold near its edge to hold down the mold when the die is raised.

12. Pressing apparatus for shaping articles of clay and the like, comprising a mold adapted to support a charge of clay, a stationary cylinder, a piston disposed in the cylinder, a piston rod extending downwardly from the piston, a die carried by the lower end of the rod and against which said charge is pressed into the form of a blank on the mold, means for introducing fluid under pressure into the top of the cylinder for normally holding the die in its lower position, means for periodically raising the die from lower position, means for raising the mold toward the die in its lower position to effect said pressing and for lowering the mold immediately after said die is raised, and stationary means adapted to be engaged by the upper surface of the mold near its edge to hold down the mold when the die is raised.

13. Pressing apparatus for shaping articles of clay and the like, comprising a stationary cylinder, a piston disposed in the cylinder, a piston rod extending downwardly from the piston, a die carried by the lower end of the rod and formed to press a charge of plastic material into the form of a blank on a mold, said die having a lower pressing surface substantially coextensive with the upper surface of said blank whereby said upper surface is engaged only by the die, means for introducing fluid under pressure into the top of the cylinder for normally holding the die in its lower position, means for periodically introducing fluid under pressure into the bottom of the cylinder for raising the die from its lower position, means for raising a mold toward the die in its lower position to effect said pressing and for lowering the mold immediately after said die is raised, and stationary means adapted to be engaged by the upper surface of a mold near its edge to hold down the mold when the die is raised.

14. Pressing apparatus for shaping articles of clay and the like, comprising a movable mold adapted to support a blank of clay, a support, a die suspended from said support, means for pressing the die and blank together for shaping the blank over the mold, means for retracting the die, a casing rigidly suspended from said support and surrounding the die, a second casing connected to the lower end of the first casing and adjustable vertically relative thereto, and means connected to the lower end of said second casing and adapted to be engaged by the upper surface of the mold near its edge to hold down the mold when the die is raised.

15. Pressing apparatus for shaping articles of clay and the like, comprising a mold adapted to support a charge of clay, a support provided with a vertical opening therethrough, a vertical tube mounted in said opening, means for adjusting the tube vertically, a rod slidably disposed in said tube and projecting from the opposite ends thereof, a die secured to the lower end of the rod and against which said charge is pressed on the mold into the form of a blank, means mounted on the upper end of said tube for periodically raising the die from pressing position, means for raising the mold towards the die in pressing position to effect said pressing and for lowering the mold after said die is raised, and stationary means adapted to be engaged by the upper surface of the mold near its edge to hold down the mold when the die is raised.

16. Pressing apparatus for shaping articles of clay and the like, comprising a mold adapted to support a charge of clay, a support provided with a vertical opening therethrough, a vertical tube mounted in said opening, means for adjusting the tube vertically, a rod slidably disposed in said tube and projecting from the opposite ends thereof, a die secured to the lower end of the rod and against which said charge is pressed on the mold into the form of a blank, a housing rigidly mounted on the upper end of the tube, means in said housing and connected to the upper end of the rod for periodically raising the die from pressing position, means for raising the mold towards the die in pressing position to effect said pressing and for lowering the mold after said die is raised, and stationary means adapted to be engaged by the upper surface of the mold near its edge to hold down the mold when the die is raised.

17. Pressing apparatus for shaping articles of clay and the like, comprising a support provided with a vertical opening therethrough, a vertical tube mounted in said opening, means for adjusting the tube vertically, a rod slidably disposed in said tube and projecting from the opposite ends thereof, a die secured to the lower end of the rod and formed to press a charge of plastic material on a mold into the form of a blank, fluid pressure cylinder rigidly mounted on the upper end of the tube, a piston rigidly mounted on the upper end of the rod in the cylinder, means for introducing fluid under pressure into the top of the cylinder for normally holding the die in its lower position, means for periodically introducing fluid under pressure into the bottom of the cylinder for raising the die, means for raising a mold toward the die in its lower position to effect said pressing and for lowering the mold after said die is raised, and stationary means adapted to be engaged by the upper surface of a mold near its edge to hold down the mold when the die is raised.

WALTER H. EMERSON.